(12) United States Patent
Martin et al.

(10) Patent No.: US 8,531,412 B1
(45) Date of Patent: Sep. 10, 2013

(54) METHOD AND SYSTEM FOR PROCESSING TOUCH INPUT

(75) Inventors: Geoffrey S. Martin, Overland Park, KS (US); Danny L. Bowman, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 582 days.

(21) Appl. No.: 12/683,149

(22) Filed: Jan. 6, 2010

(51) Int. Cl.
*G09G 5/00* (2006.01)

(52) U.S. Cl.
USPC ............ 345/173; 345/156; 345/169; 345/178

(58) Field of Classification Search
USPC .................................. 345/173–178, 156, 169
See application file for complete search history.

(56) References Cited

U.S. PATENT DOCUMENTS

| | | | |
|---|---|---|---|
| 6,535,200 B2 | 3/2003 | Philipp | |
| 6,738,048 B1 | 5/2004 | Rundel | |
| 7,123,241 B2 | 10/2006 | Bathiche | |
| 2002/0084991 A1 | 7/2002 | Harrison et al. | |
| 2002/0163506 A1* | 11/2002 | Matusis ....................... | 345/173 |
| 2006/0053387 A1 | 3/2006 | Ording | |
| 2006/0097991 A1 | 5/2006 | Hotelling et al. | |
| 2006/0132460 A1 | 6/2006 | Kolmykov-Zotov et al. | |
| 2006/0161870 A1 | 7/2006 | Hotelling et al. | |
| 2006/0161871 A1 | 7/2006 | Hotelling et al. | |
| 2007/0273658 A1* | 11/2007 | Yli-Nokari et al. ........... | 345/173 |
| 2008/0158145 A1 | 7/2008 | Westerman | |
| 2008/0158168 A1 | 7/2008 | Westerman et al. | |
| 2008/0158169 A1 | 7/2008 | O'Connor et al. | |
| 2008/0158170 A1 | 7/2008 | Herz et al. | |
| 2008/0158172 A1 | 7/2008 | Hotelling et al. | |
| 2008/0158173 A1 | 7/2008 | Hamblin et al. | |
| 2008/0158185 A1 | 7/2008 | Westerman | |
| 2008/0165140 A1 | 7/2008 | Christie et al. | |
| 2008/0168403 A1 | 7/2008 | Westerman et al. | |
| 2008/0174561 A1 | 7/2008 | Kim | |

(Continued)

FOREIGN PATENT DOCUMENTS

WO     2007038791 A1     4/2007

OTHER PUBLICATIONS

Neonode Inc., "Neonade Announces SAT (Selected Area Touch)," at http://investor.neonode.com/phoenix.zhtml?c=62246&p=irol-newsArticle&ID=1303759&highlight=, Jul. 1, 2009.
Stantum, Unlimited MultiTouch—PMatrix, at http://www.stantum.com/en/offer/pmatrix, Stantum, 2009.

(Continued)

*Primary Examiner* — Quan-Zhen Wang
*Assistant Examiner* — Jennifer Nguyen

(57) ABSTRACT

A method and system for processing touch input. A computing device with a touch-sensing interface may maintain a stored size value for touch input by a known user. The computing device may detect and then determine a size of a touch input. The computing device may then compare the determined size of the detected touch input to the stored size value for the known user's tough input. Based on this comparison, the computing device may process the touch input. For example, in response to the touch input, the computing device may (a) take a first action if the determined size exceeds the stored size value by a first value, and (b) otherwise, take a second action. In one aspect, before using the stored size value for the known user's touch input, the computing device may identify a current user of the computing device as the known user.

20 Claims, 5 Drawing Sheets

(56) References Cited

U.S. PATENT DOCUMENTS

| | | |
|---|---|---|
| 2008/0204427 A1 | 8/2008 | Heesemans et al. |
| 2008/0259046 A1 | 10/2008 | Carsanaro |
| 2008/0259053 A1 | 10/2008 | Newton |
| 2008/0304084 A1 | 12/2008 | Kim et al. |
| 2009/0256807 A1 | 10/2009 | Nurmi |
| 2010/0097324 A1* | 4/2010 | Anson et al. .................. 345/173 |
| 2010/0245288 A1* | 9/2010 | Harris ............................ 345/175 |
| 2011/0050575 A1* | 3/2011 | Krahenbuhl et al. ......... 345/168 |

OTHER PUBLICATIONS

Sima Systems, "X-Wire Resistive Multi-Touch Screens," May 2008.

Actel, "Interfacing an Actel Fusion Programmable System Chip to a Four-Wire Resistive Touchscreen," Aug. 2006.

Microsoft Research-INRIA Joint Centre, "Contact Area Interaction with Sliding Widgets," 2009.

Hrvoje Benko, Andrew D. Wilson, Patrick Baudisch, "Precise Selection Techniques for Multi-Touch Screens," 2006.

* cited by examiner

METHOD AND SYSTEM FOR PROCESSING TOUCH INPUT

BACKGROUND

Many computing devices today include a touch screen, which is a touch-sensing interface that can detect and process touch input on a display screen. A touch screen may facilitate user interaction with the computing device in a variety of ways. For example, a touch screen may enable a user to select content displayed on the computing device by simply touching that content with an object such as a body part (e.g., a finger) or an instrument (e.g., a stylus). As another example, a touch screen may enable a user to enter alphanumerical characters into the computing device via a virtual keyboard presented on the touch screen. Many other examples are possible as well. Touch screens may detect and process touch input using a variety of different technologies, including but not limited to resistive, capacitive, infrared, surface acoustic wave, frustrated total internal reflection, optical imaging, and acoustic pulse recognition.

OVERVIEW

A touch-sensing interface may measure various characteristics of a touch input, which a computing device may then use to process the touch input. For example, the touch-sensing interface may measure a location of a touch input, which the computing device may use to determine the user's selection. As another example, the touch-sensing interface may measure a size of a touch input, which the computing device may use to determine a user's desires with respect to a selection (e.g., larger-sized touch input may represent a different type of selection than smaller-sized touch input). Unlike touch input location, however, touch input size is highly user dependent. Indeed, touch input for a user with a large finger size may consistently be larger than touch input for a user with a smaller finger size. Accordingly, an improved method of processing touch input based on touch input size is desirable.

Disclosed herein are improved methods of processing touch input that are preferably carried out by a computing device with a touch-sensing interface (e.g., a portable communication device). One exemplary method may include (a) maintaining a stored size value for touch input by a known user, (b) detecting a touch input, (c) determining a size of the detected touch input, (d) comparing the determined size of the detected to the stored size value for touch input by the known user, and (e) processing the touch input based on the comparison.

Another exemplary method may include (a) maintaining a stored size value for touch input by at least one known user, (b) identifying a current user of the computing device as a known user, (c) detecting a touch input by the current user, (d) determining a size of the detected touch input, (d) comparing the determined size of the detected touch input to the stored size value for touch input by the known user, and (e) processing the touch input based on the comparison.

In one example, the computing device may maintain the stored size value for touch input by a known user by (1) determining a size value for touch input by the known user based on a plurality of prior touch inputs by the known user and (2) storing the size value. In this respect, as one possible example, the computing device may determine a size value for the known user's touch input based on a plurality of prior touch inputs by the known user by (i) measuring a size of each of a plurality of touch inputs by the known user over a given time period, and (ii) calculating the size value based on the measured sizes, such as by calculating an average, median, or mode of the measured sizes.

In another example, the computing device may process the touch input based on the comparison by (1) taking a first action in response to the touch input if the determined size exceeds the stored size value by a first value, and (2) otherwise, taking a second action in response to the touch input. In this respect, as one possible example, taking the first action may include invoking an emphasized version of a selected alphanumerical key, and taking the second action may include invoking a non-emphasized version of the selected alphanumerical key.

In yet another example, the computing device may identify the current user of the computing device as the known user based on operation of the computing device by the current user. In this respect, as one possible example, the computing device may (1) maintain stored operation data for the known user, (2) monitor operation of the computing device by the current user (such as by monitoring spatial characteristics of the computing device as operated by the current user, data input by the current user, and/or characteristics of touch input by the current user), (3) generate data indicating operation of the computing device by the current user, (4) compare the generated data to the stored operation data for the known user, and (5) determine that the generated matches the stored operation data for the known user.

Also disclosed herein is a computing device that includes (a) a touch-sensing interface, (b) a processor, (c) data storage, and (d) program instructions stored in the data storage and executable by the processor for carrying out one or more methods described herein. In one example, the computing device may additionally include an interface for communicating with an access network.

These as well as other aspects and advantages will become apparent to those of ordinary skill in the art by reading the following detailed description, with reference where appropriate to the accompanying drawings.

DETAILED DESCRIPTION

Figure 1:
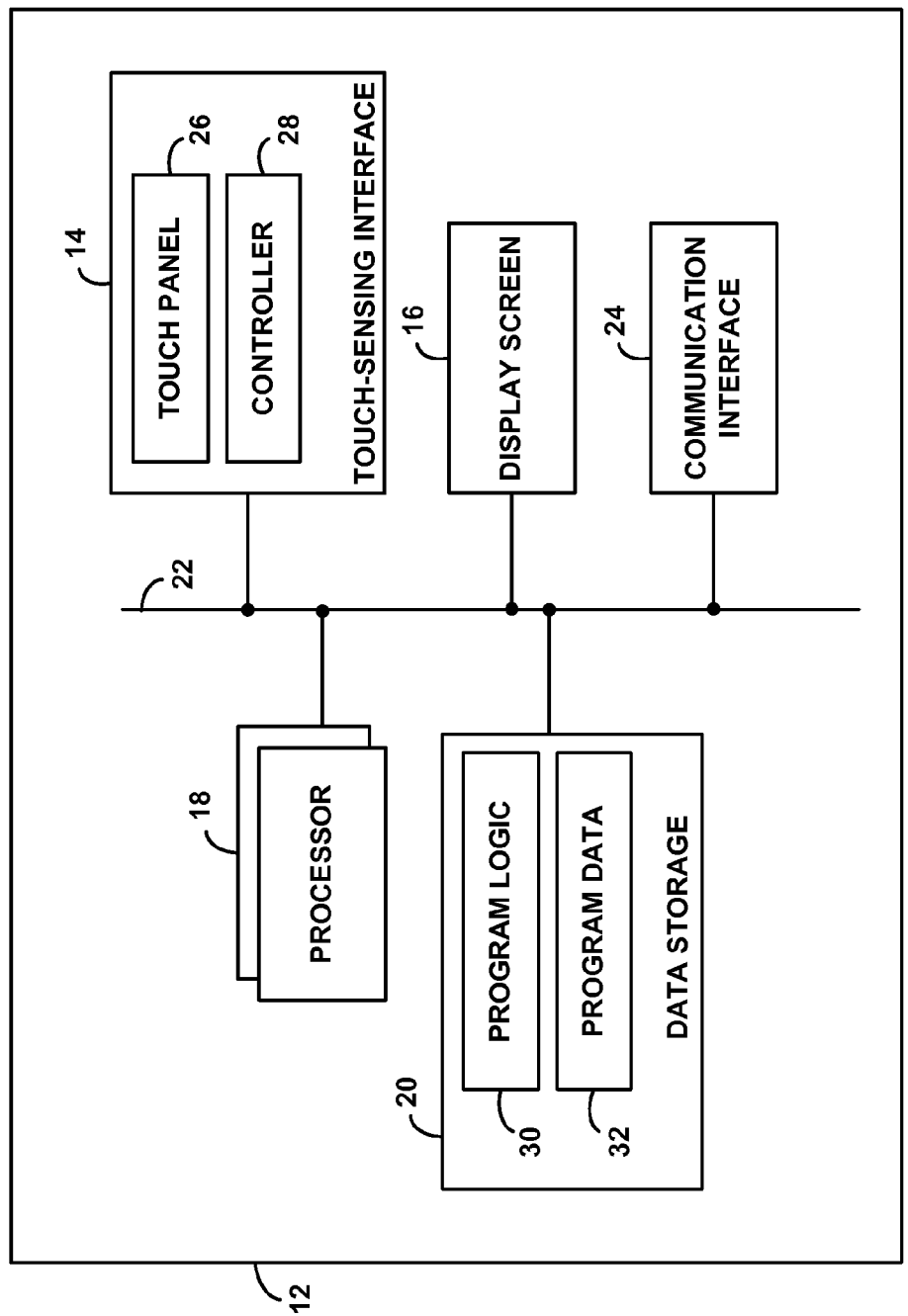
FIG. 1 is a simplified block diagram showing functional components of an exemplary computing device capable of carrying out the exemplary methods described herein.

Referring to the drawings, FIG. 1 is a simplified block diagram showing functional components of a computing device 12 capable of carrying out the exemplary methods described herein. As shown in FIG. 1, the computing device 12 may include a touch-sensing interface 14, a display screen 16, a processor 18, and data storage 20, all linked together via a system bus, network, or other connection mechanism 22. (While the touch-sensing interface 14 is described herein as an integrated component of the computing device 12, it should be understood the touch-sensing interface 14 may be a separate component that interfaces with the computing device 12.) Additionally, the computing device 12 may include a communication interface 24. Additionally yet, the computing device 12 may include other components not shown in FIG. 1. For example, computing device 12 may include other input and/or output interfaces, such as a navigation pad, a multi-functional button, a thumb wheel, a keyboard or keypad, a microphone, and/or a speaker. As another example, the computing device 12 may include components for monitoring its spatial characteristics, such as an accelerometer or a global positioning system (GPS) transceiver for instance.

It should be understood, however, that this and other arrangements described herein are set forth for purposes of example only. As such, those skilled in the art will appreciate that other arrangements and other elements (e.g., components, interfaces, functions, orders of functions, etc.) can be used instead, some elements may be added, and some elements may be omitted altogether. Further, those skilled in the art will appreciate that many of the elements described herein are functional elements that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

The touch-sensing interface 14 preferably functions to detect touch input by a user. As shown in FIG. 1, the touch-sensing interface 14 may include a touch panel 26 and a controller 28. (The term "controller" encompasses either a single controller or multiple controllers that could work in combination.) The touch panel 26 may include one or more components that function to receive and sense touch input by a user. Preferably, the touch panel 26 will be positioned in front of the display screen 16, such that the touch panel 26 covers a viewable area of the display screen 16. In this respect, the touch-sensing interface 14 and the display screen may together be considered a touch screen. The controller 28 may function to control the touch panel 26, detect and process touch input on the touch panel 26, and communicate touch input data to the processor 18. In this respect, the controller 28 may include and/or interface with circuitry for controlling the touch panel 26 and/or detecting touch input on the touch panel 26.

The touch-sensing interface 14 may take a variety of forms. In one example, the touch-sensing interface 14 may be a resistive touch-sensing interface 14. In this respect, the touch panel 26 may include two layers of transparent material separated by an air gap or microdots. The inside surface of both layers may be coated with a transparent conductive material. In one example, the conductive material may be patterned to form a plurality of nodes that facilitate the sensing of multiple touch inputs simultaneously. When a user touches the touch panel 26, the coated layers may come into contact and cause a change in electrical characteristics of the touch panel 26. The controller 28 may then detect and process this change in electrical characteristics.

In another example, the touch-sensing interface 14 may be a capacitive touch-sensing interface 14. In this respect, the touch panel 26 may include one or more layers of transparent material coated with a transparent conductive material that stores electrical charge. In one example, the conductive material may be patterned to form a plurality of nodes that facilitate the sensing of multiple touch inputs simultaneously. When a user touches the touch panel 26, a small capacitance may form between the user's finger and the conductive material, thus causing a change in electrical characteristics of the touch panel 26. The controller 28 may detect (e.g., via a sensing circuit) and process this change in electrical characteristics.

In yet another example, the touch-sensing interface 14 may be an infrared the touch-sensing interface 14. In this respect, the touch panel 26 may include a layer of transparent material. Alternatively, the touch panel 26 may simply be an empty frame that is positioned on top of the display screen 16. The controller 28 may include and/or interface with (a) light emitting diodes (LEDs) that send a grid of light beams across the touch panel 26 and (b) photoreceptors that detect the light beams sent across the touch panel 26 by the LEDs. When a user touches the touch panel 26, some of the light beams emanating from the LEDs are obstructed, thus causing a change in light received by the photoreceptors. The controller 28 may detect and process this change in light received by the photoreceptors.

While example technologies for the touch-sensing interface 14 have been described herein, it should be understood that other technologies may also be used. As additional examples, the touch-sensing interface 14 may be a surface acoustic wave touch-sensing interface, a frustrated total internal reflection touch-sensing interface, an optical imaging touch-sensing interface, or an acoustic pulse recognition touch-sensing interface.

Figure 2:
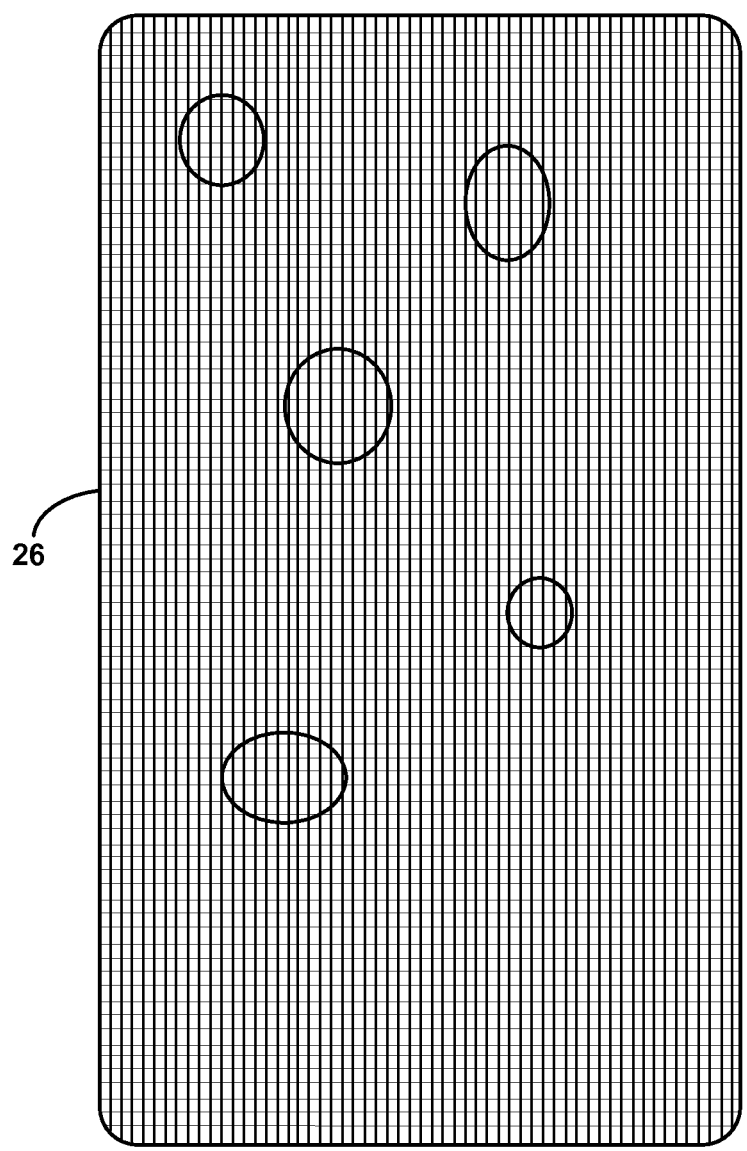
FIG. 2 depicts one preferred technology for determining touch input size.

In addition to detecting touch input by a user, the touch-sensing interface 14 will also preferably function to determine a size of a touch input. In this respect, the touch-sensing interface 14 may use any technology now known or later developed to determine touch input size. FIG. 2 depicts one preferred technology for determining touch input size. As shown in FIG. 2, the touch-sensing interface 14 may include a touch panel 26 with a plurality of touch-sensing nodes, which may be formed at the intersection of conductive traces. (It should be understood, however, that touch-sensing nodes or sections may be formed in other manners as well.) The touch-sensing interface 14 may determine a size of a touch input based on a quantity and configuration of the touch-sensing nodes contacted by a touch input. Several exemplary touch inputs having different sizes, and thus encompassing different quantities and configurations of touch-sensing nodes, are depicted in FIG. 2. Other technologies for determining touch input size may be used as well.

Referring back to FIG. 1, the display screen 16 may function to display viewable content generated by the computing device 12, such as graphics and/or text. In this respect, the display screen 16 may include a display panel and associated components to display the viewable content in the display panel. The display screen 16 may take a variety of forms. For example, without limitation, the display screen 16 may be a liquid crystal display (LCD) device, a cathode ray tube (CRT) device, a plasma device, and/or any other display screen 16 now known or later developed. Further, the display screen 16 may have a variety of different dimensions, aspect ratios, and/or resolutions.

Preferably, the display screen 16 will function to display a graphical user interface (GUI) with which a user can interact via the touch-sensing interface 14. The GUI may display graphical images such as windows, fields, dialog boxes, menus, icons, a keyboard, buttons, cursors, and/or scroll bars for instance. These graphical images may be associated with programs, files, and/or operational options, and may initiate functions when selected by a user via the touch-sensing interface 14. For example, a user may select a GUI icon that initiates opening of a program. As another example, a user may select a GUI icon that initiates a phone call to a person associated with the icon. As yet another example, a user may select keys on a GUI keyboard (e.g., a QWERTY keyboard) that initiates the input of the associated alphanumerical characters into the computing device 12. Many other examples are possible as well.

The processor 18 may comprise one or more general purpose microprocessors and/or dedicated signal processors. (The term "processor" encompasses either a single processor or multiple processors that could work in combination.) Data storage 20, in turn, may comprise memory and/or other storage components, such as optical, magnetic, organic or other memory or storage, which can be volatile and/or non-volatile, internal and/or external, and integrated in whole or in part with the processor 18. Data storage 20 preferably contains or is arranged to contain (i) program logic 30 and (ii) program data 32. Although these components are described herein as separate data storage elements, the elements could just as well be physically integrated together or distributed in various other ways. Preferably, the program data 32 would be maintained in data storage 20 separate from the program logic 30, for easy updating and reference by the program logic 30.

Program logic 30 preferably comprises machine-language instructions that may be executed or interpreted by processor 18 to carry out functions in accordance with the exemplary methods described herein. It should be understood, however, that the program logic 30 and its associated functions are described herein by way of example only. As such, those skilled in the art will appreciate that other program logic and/or functions may be used instead, some program logic and/or functions may be added, and some program logic and/or functions may be omitted altogether.

The communication interface 24 may function to facilitate communication between the computing device 12 and one or more networks, such as an access network and/or a packet-based network. In this respect, the computing device 12 may take the form of a portable communication device, such as a cellular telephone, smartphone, personal digital assistant, ultramobile PC, and/or personal navigation device (PND) for instance. The communication interface 24 may take the form of a chipset and antenna adapted to facilitate wireless communication according a desired protocol, an Ethernet network interface module, and/or any other interface that provides for wireless and/or wired communication with a network. The communication interface 24 may also include multiple communication interfaces, such as one communication interface for each network with which the computing device 12 communicates. Other configurations are also possible.

Figure 3:
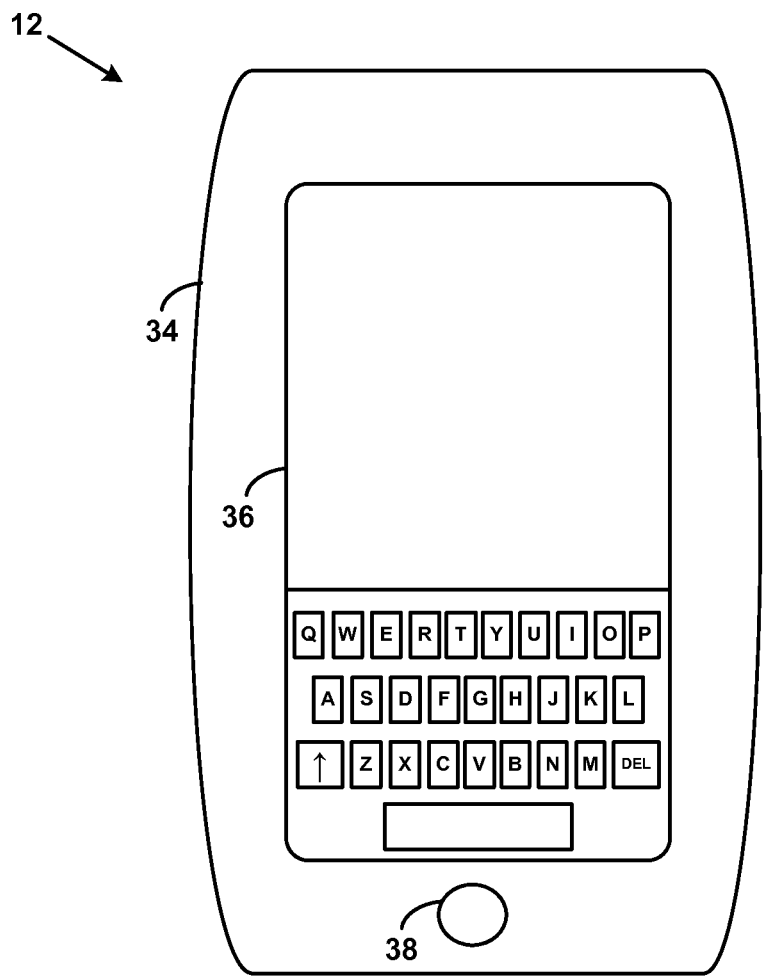
FIG. 3 is a schematic drawing of a front view of the computing device of FIG. 1.

FIG. 3 is a schematic drawing of a front view of the computing device 12. As shown, the front view of the computing device 12 may include a housing 34 that houses the components of the computing device 12, a touch screen 36 that is preferably a combination of the touch-sensing interface 14 and the display screen 16, and a multifunction button 38. The front of the housing 34 may include a cutout that exposes a viewable portion of the touch screen 36. For purposes of illustration, the touch screen 36 is displaying a GUI with a QWERTY keyboard. The front of the housing 34 may also include a cutout that exposes the multifunction button 38. Many other configurations for the front view of the computing device 12 are possible as well.

Figure 4:
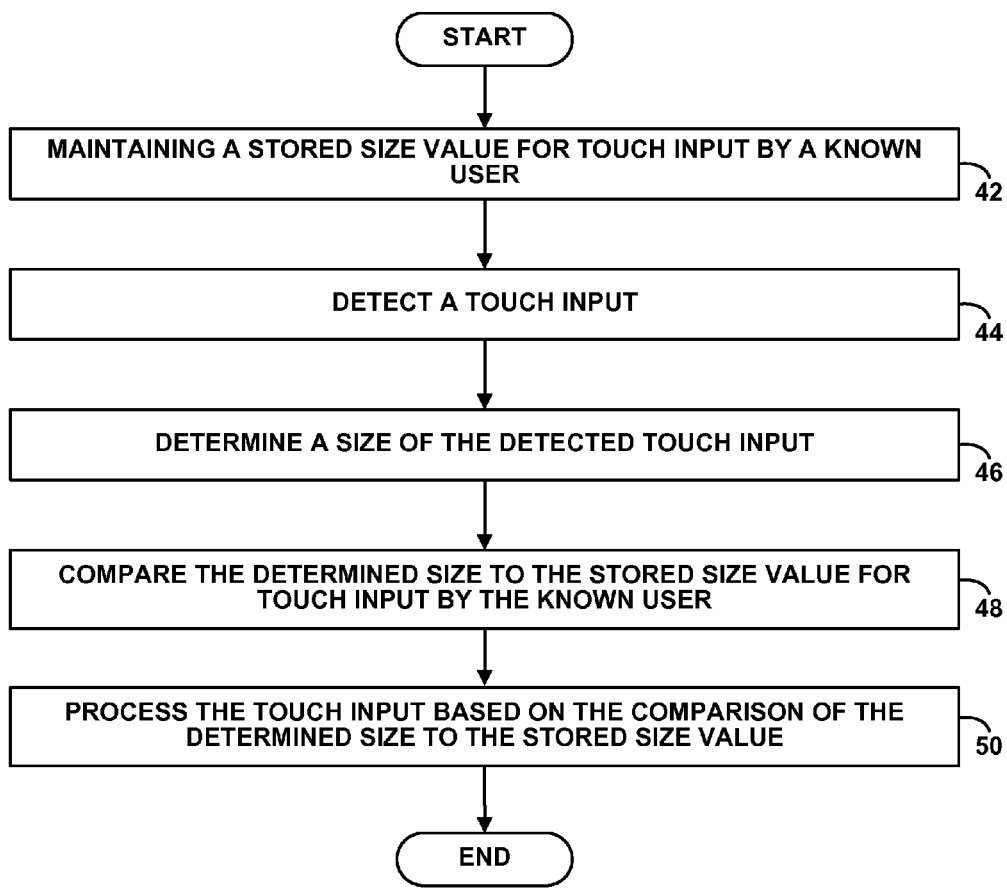
FIG. 4 is a flow chart depicting an exemplary method of processing touch input.

FIG. 4 is a flow chart depicting a first exemplary method of processing touch input. For purposes of illustration, the following description assumes that the computing device 12 carries out the exemplary method.

The exemplary method begins with at step 42 with the computing device 12 maintaining a stored size value for touch input by a known user (e.g., the owner of the computing device 12 or a person associated with the owner). In this respect, the stored size value will preferably represent a size of the known user's normal touch input. (While the stored size value is described herein as a single value, it should be understood that the stored size value may be a range of values). The stored size value may take a variety of forms. In one example, the stored size value may be an area of the known user's normal touch input. In another example, the stored size value may be a length and width of the known user's normal touch input. In yet another example, the stored size value may be a quantity and/or configuration of touch-sensing nodes contacted by the known user's normal touch input. Other examples are possible as well.

The computing device 12 may determine the stored size value for the known user's touch input in a variety of manners. In one aspect, the computing device 12 may determine the stored size value for the known user's touch input based on text data input by either the known user or another user (e.g., a salesperson). In this respect, the known user and/or another user may measure a size of the known user's touch input using any technique now known or later developed, and may then input a textual representation of the known user's touch size to the computing device 12.

In another aspect, the computing device 12 may determine the stored size value for the known user's touch input based on a plurality of prior touch inputs by the known user. In this respect, the computing device 12 may first measure a size of each touch input by the known user over a given time period. In a preferred example, the computing device 12 will perform these measurements during an initial calibration period that occurs after the known user activates the device. In another example, the computing device 12 may perform these measurements during a subsequent calibration period, which may be invoked by the known user and/or the device. In yet another example, the computing device 12 may perform these measurements during normal operation by the known user. Other examples are possible as well. The computing device 12 may then use the set of measured sizes to calculate the known user's stored size value. As examples, the computing device 12 may calculate the known user's stored size value as an average, median, or mode of the set of the measured sizes. The computing device 12 may determine the stored size value for the known user's touch input using other techniques as well.

At step 44, the computing device 12 detects a touch input. In turn, at step 46, the computing device 12 determines a size of the detected touch input. The computing device 12 may use any technology now known or later developed for detecting touch input and determining touch input size, including the technologies described above with respect to the touch-sensing interface 14.

At step 48, the computing device 12 compares the determined size of the detected touch input to the stored size value for the known user's touch input. In this respect, the computing device 12 may determine whether the detected touch input occupies a smaller, larger, or relatively equal size to the known user's normal touch input.

At step 50, the computing device 12 then processes the detected touch input based on the comparison of the determined size of the detected touch input to the stored size value for the known user's touch input. In one aspect, the computing device 12 may process the touch input based on the comparison by (a) taking a first action in response to the touch input if the determined size exceeds the stored size value by a first value, and (b) otherwise, taking a second action in response to the touch input. In this respect, the first and second actions may take a variety of forms. For example, the first action may be invoking an emphasized (e.g., bolded, italicized, etc.) version of a selected alphanumerical key and the second action may be invoking a non-emphasized version of the selected alphanumerical key. As another example, the first action may be calling a selected contact and the second action may be displaying the selected contact's details. As yet another example, the first action may be displaying a selected item in full and the second action may be displaying a preview of the selected item. Many other examples for the first and second actions are also possible.

In another aspect, the computing device 12 may process the touch input based on the comparison by (a) taking a first action in response to the touch input if a difference between the determined size and the stored size value is less than a second value, and (b) otherwise, taking no action in response to the touch input. In this respect, the first action may take a variety of forms, including those described above. The computing device 12 may process the touch input based on the comparison in other manners as well.

Advantageously, a computing device carrying out the method described herein may be able to process a known user's touch input more accurately. In particular, a computing device carrying out the method described herein may process the known user's touch input by comparing a size of the known user's touch input with a touch size value that is unique to the known user, as opposed to a generic touch size value. In this respect, the computing device may be able to more accurately assess whether the known user is pushing harder or softer than normal, and the computing device may use this information to process the touch input.

In a typical scenario, the computing device 12 will be operated almost exclusively by a single user, such as an owner of the device or a person associated with the owner (e.g., a child or employee of the owner). In this respect, the computing device 12 may maintain a stored size value for touch input by one known user only, and the computing device 12 may function as if only that known user operates the computing device 12. In another scenario, however, the computing device 12 may be operated by multiple users, some of which may be known to the computing device 12. In this respect, the computing device 12 may maintain a stored size value for touch input by one or more known users, and the computing device 12 may identify a current user of the device as a known user before processing the current user's touch input with a unique touch size value.

In one aspect, the computing device 12 may identify the current user of the device as the known user based on identification data (e.g., a user identifier and/or a password) input by the user. In this respect, the computing device 12 may maintain stored identification data for at least one known user, which may be correlated with stored size values for the at least one known user. The computing device 12 may then receive identification data from the current user and compare the identification data to the stored identification data, to determine whether the current user is a known user. If the computing device 12 identifies the current user as a known user, the computing device 12 may then use the known user's stored size value to process touch input as described above. Otherwise, the computing device 12 may either use a generic size value to process touch input or disable the processing of touch input based on touch input size.

Figure 5:
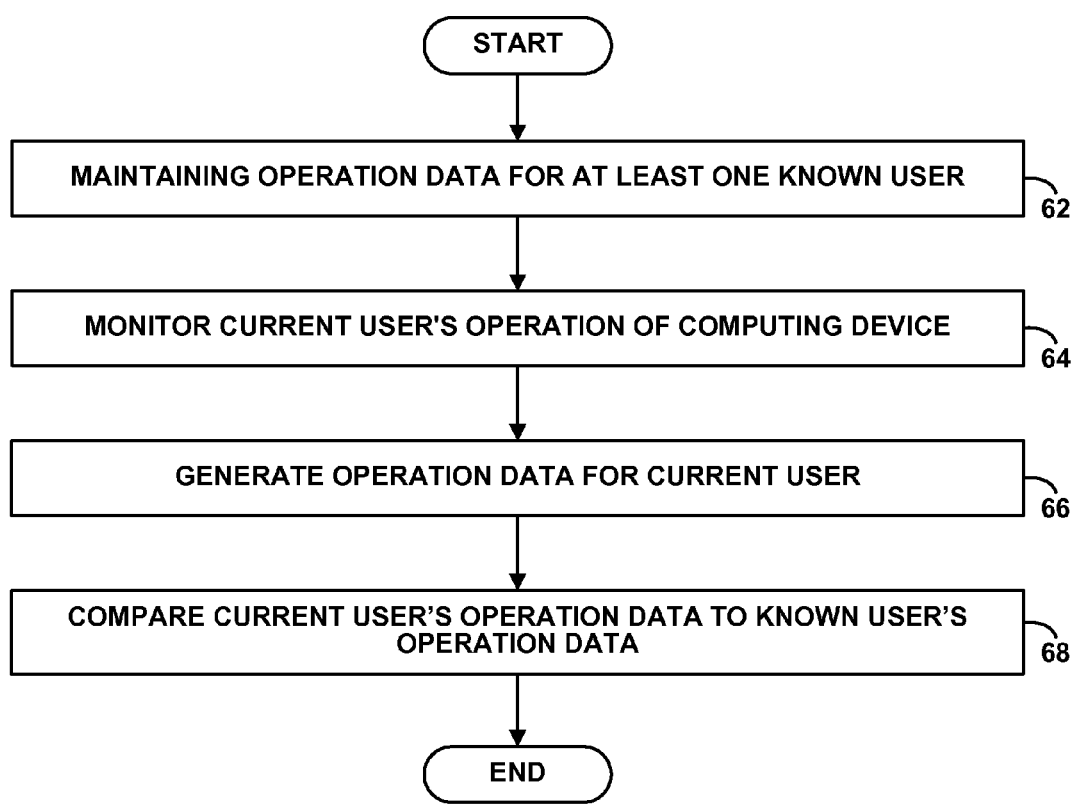
FIG. 5 is a flow chart depicting an exemplary method of identifying a current user of the computing device of Figure as a known user.

In another aspect, the computing device 12 may identify the current user of the computing device 12 as the known user based on the current user's operation of the computing device 12. FIG. 5 is a flow chart depicting an exemplary method of identifying the current user of the computing device 12 as the known user based on the current user's operation of the computing device 12. For purposes of illustration, the following description assumes that the computing device 12 carries out the exemplary method.

The method may begin at step 62 with the computing device 12 maintaining operation data for at least one known user. In this respect, the operation data for the known user preferably indicates typical operation of the computing device 12 by the known user. In one example, the operation data may include data indicating the computing device's typical spatial characteristics as operated by the known user, such as one or more typical tilt angles or geographic locations of the computing device 12 as operated by the known user. As another example, the operation data may include data indicating typical data input by the known user, such as typical words, phrases, program selections, or file selections input by the known user. As yet another example, the operation data may include data indicating typical characteristics of the known user's touch input, such as a typical speed or accuracy of the known user's touch input with respect to a GUI (e.g., a QWERTY keyboard). Other examples are possible as well. Preferably, the computing device 12 will maintain the known user's stored operation data together with the known user's stored identification data and the known user's stored size value, in a known user profile.

The computing device 12 may determine the operation data for the known user in a variety of manners. In one preferred aspect, the computing device 12 may determine the operation data based on known user's operation of the computing device 12 over a given time period. In one example, the computing device 12 may monitor the known user's operation during an initial calibration period that occurs after the known user first registers with the device. In another example, the computing device 12 may monitor the known user's operation during a subsequent calibration period, which may be invoked by the known user and/or the device. In yet another example, the computing device 12 may monitor the known user's operation during normal operation by the known user. Other examples are possible as well. The computing device 12 may determine the operation data for the known user using other techniques as well.

At step 64, the computing device 12 monitors the current user's operation of the computing device 12. In this respect, the computing device 12 may monitor the current user's operation in a variety of manners. In one aspect, the computing device 12 may monitor spatial characteristics of the computing device 12 as operated by the current user. For example, during operation by the current user, the computing device 12 may monitor the device's tilt angle (e.g., via an accelerometer or tilt sensor) and/or the device's geographic location (e.g., via a GPS transceiver or other location-determination components). In another aspect, the computing device 12 may monitor data input by the current user. For example, the computing device 12 may monitor text data input by the current user, such as words or phrases input by the current user. As another example, the computing device 12 may monitor selection data input by the current user, such as programs or files selected by the current user. As yet another example, the computing device 12 may monitor speech data input by the current user. In yet another aspect, the computing device 12 may monitor characteristics of touch input by the current user. For example, the computing device may monitor speed and/or accuracy of touch input by the current user with respect to a GUI. The computing device 12 may monitor the current user's operation in other manners as well.

At step 66, the computing device 12 generates data indicating the current user's operation of the computing device 12 (i.e., operation data for the current user). In turn, at step 68, the computing device 12 compares the current user's operation data to the known user's stored operation data, to determine whether the current user's operation data matches the known user's stored operation data. For example, the computing device 12 may compare the current user's operation data to the known user's stored operation data with respect to the computing device's spatial characteristics (e.g., tilt angle, geographic location, etc.). As another example, the computing device 12 may compare the current user's operation data to the known user's stored operation data with respect to the input data (e.g., text input, selection input, speech input, etc.). As yet another example, the computing device 12 may compare the current user's operation data to the known user's stored operation data with respect to touch input characteristics (e.g., location, size, speed and/or accuracy with respect to a GUI, etc.). Other examples are possible as well.

Preferably, when determining whether the current user's operation data matches the known user's stored operation data, the computing device 12 will consider both the similarity across the different types of operation data and the degree of similarity for each type of operation data. For example, if the current user's operation data exhibits a moderate degree of similarity to the known user's operation data across a large number of operation data types, the computing device may determine that the current user's operation data matches the known user's stored operation data. As another example, if the current user's operation data exhibits a high degree of similarity to the known user's operation data across a smaller number of operation data types, the computing device may determine that the current user's operation data matches the known user's stored operation data. Many other examples are possible as well.

If the computing device 12 determines that the current user's operation data matches the known user's stored operation data, the computing device 12 may then use the known user's stored size value to process touch input as described above. Otherwise, the computing device 12 may either use a generic size value to process touch input or disable the processing of touch input based on touch size.

Exemplary embodiments have been described above. Those skilled in the art will understand, however, that changes and modifications may be made to the embodiments described without departing from the true scope and spirit of the present invention, which is defined by the claims.

We claim:

1. A method, carried out by a computing device with a touch-sensing interface, the method comprising:
   the computing device maintaining a plurality of stored size values from which one reference size value is selected at any given time for use in processing touch input, wherein the plurality of stored size values includes a stored size value for touch input by a given known user;
   the computing device identifying a current user of the computing device as the given known user;
   in response to identifying the current user as the given known user, the computing device selecting, from the plurality of stored size values, the stored size value for touch input by the given known user as the reference size value for use in processing touch input;
   the computing device thereafter detecting a touch input by the current user;
   the computing device determining a size of the detected touch input;
   the computing device comparing the determined size of the detected touch input to the selected size value for touch input by the given known user; and
   the computing device processing the detected touch input based on the comparing.

2. The method of claim 1, wherein maintaining the stored size value for touch input by the given known user comprises:
   the computing device determining a size value for touch input by the given known user based on a plurality of prior touch inputs by the given known user; and the computing device storing the size value.

3. The method of claim 2, wherein the computing device determining the size value for touch input by the given known user based on a plurality of prior touch inputs by the given known user comprises:
   the computing device measuring a size of each of a plurality of touch inputs by the given known user over a given time period; and
   the computing device calculating the size value based on the measured sizes.

4. The method of claim 1, wherein the computing device identifying the current user of the computing device as the given known user comprises the computing device identifying the current user of the computing device as the given known user based on operation of the computing device by the current user.

5. The method of claim 4, wherein the computing device identifying the current user of the computing device as the given known user based on operation of the computing device by the current user comprises:
   the computing device maintaining stored operation data for the given known user;
   the computing device monitoring operation of the computing device by the current user;
   the computing device generating data indicating operation of the computing device by the current user;
   the computing device comparing the generated data to the stored operation data for the given known user; and
   the computing device determining that the generated data matches the stored operation data for the given known user.

6. The method of claim 5, wherein the computing device monitoring operation of the computing device by the current user comprises the computing device monitoring spatial characteristics of the computing device as operated by the current user.

7. The method of claim 5, wherein the computing device monitoring operation of the computing device by the current user comprises the computing device monitoring data input by the current user.

8. The method of claim 5, wherein the computing device monitoring operation of the computing device by the current user comprises the computing device monitoring characteristics of touch input by the current user.

9. The method of claim 1, wherein the computing device processing the touch input based on the comparison comprises:
   taking a first action in response to the touch input if the determined size exceeds the selected size value by a first value; and
   otherwise, taking a second action in response to the touch input.

10. The method of claim 9, wherein taking the first action comprises invoking an emphasized version of a selected alphanumerical key, and wherein taking the second action comprises invoking a non-emphasized version of the selected alphanumerical key.

11. A computing device comprising:
    a touch-sensing interface;
    a processor;

data storage;

data stored in data storage that represents a plurality of size values from which one reference size value is selected at any given time for use in processing touch input, wherein the plurality of size values includes a size value for touch input by a given known user; and program instructions stored in the data storage and executable by the processor for:

identifying a current user of the computing device as the given known user;

in response to identifying the current user as the given known user, selecting, from the plurality of size values, the size value for touch input by the given known user as the reference size value for use in processing touch input;

thereafter detecting a touch input by the current user;

determining a size of the detected touch input;

comparing the determined size of the detected touch input to the selected size value for touch input by the given known user; and processing the touch input based on the comparing.

12. The computing device of claim 11, further comprising: an interface for communicating with an access network.

13. The computing device of claim 11, wherein the size value for touch input by the given known user comprises a size value determined based on a plurality of prior touch inputs by the given known user.

14. The computing device of claim 11, wherein the program instructions for identifying the current user of the computing device as the given known user comprises program instructions for identifying the current user of the computing device as the given known user based on operation of the computing device by the current user.

15. The computing device of claim 14, wherein the program instructions for identifying the current user of the computing device as the given known user based on operation of the computing device by the current user comprise program instructions for:

monitoring operation of the computing device by the current user;

generating data indicating operation of the computing device by the current user;

comparing the generated data to operation data for the given known user, wherein the operation data is stored in data storage; and determining that the generated data matches the operation data for the given known user.

16. The computing device of claim 15, wherein the program instructions for monitoring operation of the computing device by the current user program instructions for monitoring spatial characteristics of the computing device as operated by the current user.

17. The computing device of claim 15, wherein the program instructions for monitoring operation of the computing device by the current user comprises program instructions for monitoring data input by the current user.

18. The computing device of claim 11, wherein the program instructions for processing the touch input based on the comparison comprise program instructions for:

taking a first action in response to the touch input if the determined size exceeds the size value for the given known user by a first value; and taking a second action in response to the touch input if the determined size does not exceed the size value for the given known user by the first value.

19. The computing device of claim 18, wherein:

the program instructions for taking the first action comprise program instructions for invoking an emphasized version of a selected alphanumerical key, and the program instructions for taking the second action comprise program instructions for invoking a non-emphasized version of the selected alphanumerical key.

20. A non-transitory computer-readable medium having program instructions stored thereon, the program instructions comprising:

program instructions for identifying a current user of a computing device as a given known user;

program instructions for responding to the identifying by (a) accessing data that represents a plurality of size values from which one reference size value is selected at any given time for use in processing touch input at the computing device, wherein the plurality of size values includes a size value for touch input by a given known user, and (b) selecting the size value for touch input by the given known user as the reference size value for use in processing touch input at the computing device;

program instructions for thereafter detecting a touch input by the current user;

program instructions for determining a size of the detected touch input;

program instructions for comparing the determined size of the detected touch input to the selected size value for touch input by the given known user; and program instructions for processing the touch input based on the comparing.

* * * * *